US008584235B2

(12) United States Patent
Topan et al.

(10) Patent No.: US 8,584,235 B2
(45) Date of Patent: Nov. 12, 2013

(54) FUZZY WHITELISTING ANTI-MALWARE SYSTEMS AND METHODS

(75) Inventors: Vlad I. Topan, Cluj-Napoca (RO); Sorin V. Dudea, Bucharest (RO); Viorel D. Canja, Bucharest (RO)

(73) Assignee: Bitdefender IPR Management Ltd., Nicosia (CY)

( * ) Notice: Subject to any disclaimer, the term of this patent is extended or adjusted under 35 U.S.C. 154(b) by 134 days.

(21) Appl. No.: 13/312,686

(22) Filed: Dec. 6, 2011

(65) Prior Publication Data

US 2013/0111591 A1    May 2, 2013

Related U.S. Application Data

(60) Provisional application No. 61/554,859, filed on Nov. 2, 2011.

(51) Int. Cl.
- G06F 21/00 (2013.01)
- G06F 7/04 (2006.01)
- G06F 11/30 (2006.01)
- H04L 9/28 (2006.01)

(52) U.S. Cl.
USPC .............. 726/22; 713/179; 713/187; 713/188

(58) Field of Classification Search
None
See application file for complete search history.

(56) References Cited

U.S. PATENT DOCUMENTS

| 7,367,056 | B1 | 4/2008 | Nachenberg et al. |
| 7,478,429 | B2 * | 1/2009 | Lyon ............................... 726/23 |
| 7,478,431 | B1 | 1/2009 | Nachenberg |
| 7,577,848 | B2 | 8/2009 | Hallin et al. |
| 7,613,701 | B2 * | 11/2009 | Zhao et al. ............................. 1/1 |
| 7,698,744 | B2 * | 4/2010 | Fanton et al. .................... 726/27 |
| 7,854,002 | B2 | 12/2010 | Akella et al. |
| 7,865,947 | B2 * | 1/2011 | Fanton et al. .................... 726/16 |
| 7,873,947 | B1 | 1/2011 | Karim et al. |
| 8,401,309 | B2 * | 3/2013 | Madruga et al. .............. 382/209 |
| 2006/0150256 | A1 * | 7/2006 | Fanton et al. .................... 726/27 |
| 2008/0040804 | A1 | 2/2008 | Oliver et al. |
| 2008/0134337 | A1 | 6/2008 | Crescenzo et al. |
| 2008/0209557 | A1 | 8/2008 | Herley et al. |
| 2008/0263669 | A1 | 10/2008 | Alme |

(Continued)

OTHER PUBLICATIONS

European Patent Office (EPO/ISA), International Search Report and Written Opinion Mailed May 15, 2013 for International Application No. PCT/RO2012000020, Applicant: Bitdefender IPR Management Ltd., p. 1-11.

(Continued)

Primary Examiner — Christopher Revak
(74) Attorney, Agent, or Firm — Law Office of Andrei D Popovici, PC

(57) ABSTRACT

In some embodiments, an anti-malware system accounts for benign differences between non-malicious data objects, such as differences introduced by compilers and other polymorphisms. A target object is separated into a multitude of code blocks, and a hash is calculated for each code block. The obtained set of target hashes is then compared against a database of hashes corresponding to code blocks extracted from whitelisted objects. A target object may be labeled as whitelisted (trusted, non-malicious) if it has a substantial number of hashes in common with a whitelisted object. Objects which are slightly different from known whitelisted objects may still receive whitelisting status. By allowing a certain degree of mismatch between the sets of hashes of distinct objects, some embodiments of the present invention increase the efficiency of whitelisting without an unacceptable decrease in safety.

30 Claims, 8 Drawing Sheets

(56) References Cited

U.S. PATENT DOCUMENTS

| | | | |
|---|---|---|---|
| 2009/0083852 A1* | 3/2009 | Kuo et al. | 726/22 |
| 2010/0088745 A1 | 4/2010 | Song et al. | |
| 2010/0216434 A1* | 8/2010 | Marcellino et al. | 455/412.2 |
| 2011/0029772 A1* | 2/2011 | Fanton et al. | 713/165 |
| 2011/0093426 A1 | 4/2011 | Hoglund | |
| 2011/0113249 A1* | 5/2011 | Gelbard et al. | 713/170 |
| 2011/0167050 A1* | 7/2011 | Fanton et al. | 707/698 |
| 2011/0167260 A1* | 7/2011 | Fanton et al. | 713/165 |
| 2011/0185417 A1* | 7/2011 | Zhou et al. | 726/22 |

OTHER PUBLICATIONS

Komondoor et al., "Using Slicing to Identify Duplication in Source Code," Lecture Notes in Computer Science: SAS '01 Proceedings of the 8th International Symposium on Static Analysis, 2126: p. 40-56, Springer-Verlag, London, UK; Jul. 2011.

Bruschi et al., "Code Normalization for Self-Mutating Malware," IEEE Security and Privacy Journal, 5 (2): p. 46-54, IEEE Educational Activities Department, Piscataway, NJ; Mar.-Apr. 2007.

Kumar et al., "A Survey on Software Clone Detection Research," Technical Report No. 2007-541: p. 1-115, School of Computing, Queen's University at Kingston, Ontario Canada; Sep. 26, 2007.

Bruschi et al., "Using Code Normalization for Fighting Self-Mutating Malware", Rapporto tecnico n. 08-06: p. 1-14, Dipartimento di Informatica e Comunicazione, Universita degli Studi di Milano, Milano Italy; Mar. 1, 2006.

Ducasse et al., "A Language Independent Approach for Detecting Duplicating Codep," p. 109-118, ICSM '99 Proceedings of the IEEE International Conference on Software Maintenance, IEEE Computer Society, Washington, DC; Sep. 1999.

Kontogiannis et al., "Pattern Matching Techniques for Clone Detection," Journal of Automated Software Engineering, 3(1-2): pp. 77-108, Kluwer Academic Publishers, Moston, MA; Jun. 1996.

Baker, "On Finding Duplication and Nearduplication in large Software Systems," WCRE '95 Proceedings of the Second Working Conference on Reverse Engineering, p. 86-95, IEEE Computer Society, Washington, DC; Jul. 1995.

\* cited by examiner

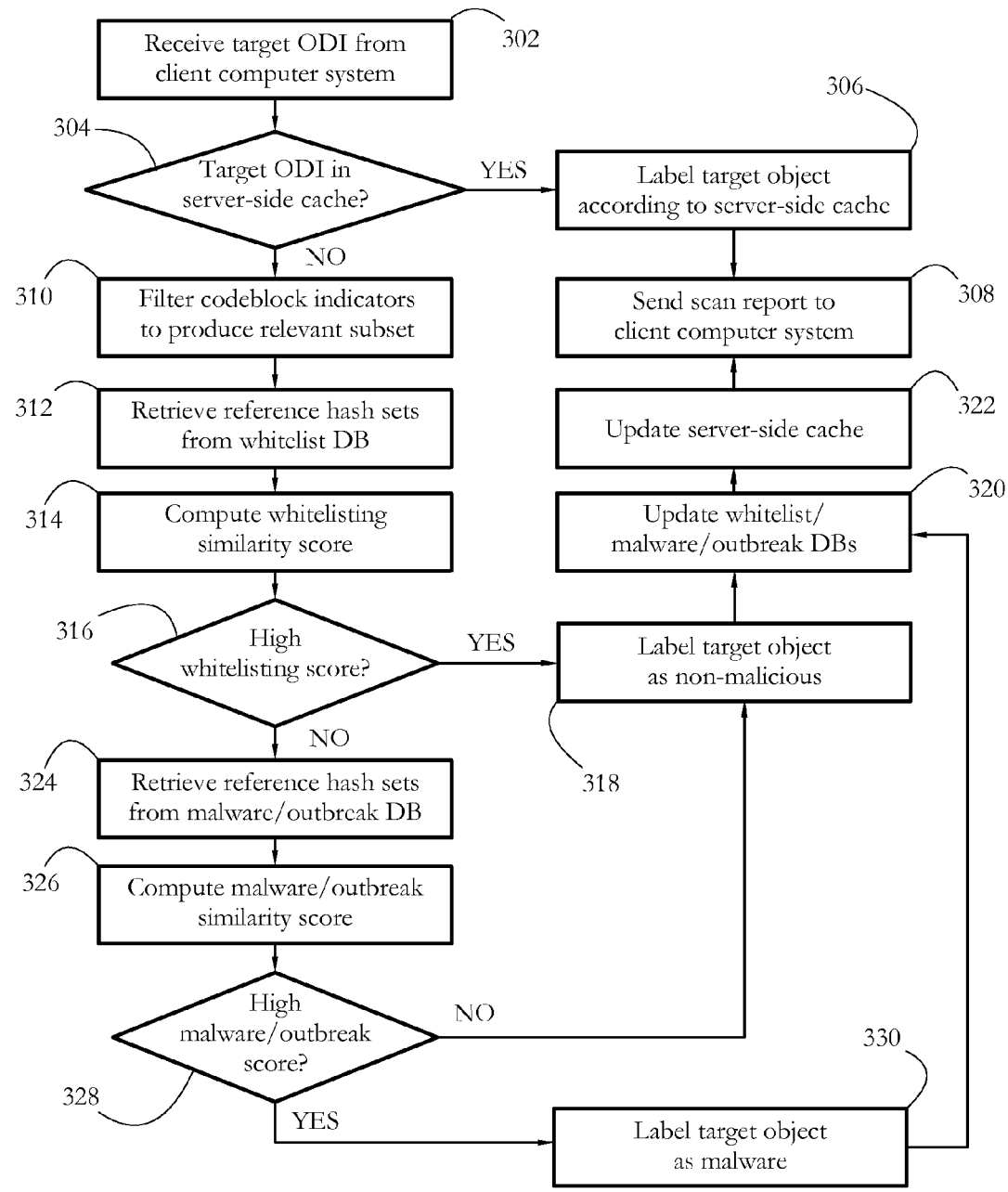

FUZZY WHITELISTING ANTI-MALWARE SYSTEMS AND METHODS

CROSS REFERENCE TO RELATED APPLICATION(S)

This application claims the benefit of the filing date of U.S. Provisional Patent Application No. 61/554,859, filed on Nov. 2, 2011, which is hereby incorporated by reference in its entirety.

BACKGROUND

The invention relates to systems and methods for protecting users from malicious software, and in particular to software whitelisting.

Malicious software, also known as malware, affects a great number of computer systems worldwide. In its many forms such as computer viruses, worms, Trojan horses, and rootkits, malware presents a serious risk to millions of computer users, making them vulnerable to loss of data, identity theft, and loss of productivity, among others.

Computer programs dedicated to malware scanning employ various methods of detecting and eliminating malware from user computer systems. Such methods include behavior-based techniques and content-based techniques. Behavior-based methods may involve allowing a suspected program to execute in an isolated virtual environment, identifying malicious behavior, and blocking the execution of the offending program. In content-based methods, the contents of a suspected file are commonly compared to a database of known malware-identifying signatures. If a known malware signature is found in the suspected file, the file is labeled as malicious.

Other methods of combating malware employ application whitelisting, which comprises maintaining a list of software and behaviors that are allowed on a user's computer system, and blocking all other applications from executing. Such methods are particularly effective against polymorphic malware, which is able to randomly modify its malware-identifying signature, rendering conventional content-based methods ineffective.

Some whitelisting applications employ hash values to identify and ensure the integrity of whitelisted software. A cryptographic hash may be created for a file or group of files affiliated with a whitelisted application and stored for reference. The respective application is then authenticated by comparing the stored hash to a new hash generated at runtime.

The performance of anti-malware whitelisting methods may depend on the capability to maintain and update whitelist databases in a efficient and flexible manner.

SUMMARY

According to one aspect, a method comprises performing at a client computer system an initial malware scan of a plurality of target objects of the client computer system; and, in response to a tentative determination by the initial malware scan that the target object is suspected of being malicious: generating at the client computer system a plurality of target hashes of the target object, each target hash representing a distinct code block of the target object, each distinct code block consisting of a sequence of processor instructions of the target object; sending from the client computer system to a server computer system connected to the client computer system over a wide area network; and receiving at the client computer system from the server computer system a server-side indicator of whether the target object is malicious. The server-side indicator is generated by the server computer system by: for at least a target hash of the plurality of target hashes, retrieving a plurality of reference hashes of a reference object, the reference object selected from a set of whitelisted objects according to the target hash, and when the plurality of target hashes is not identical to the plurality of reference hashes, determining a similarity score according to a count of hashes common to both the plurality of target hashes and the plurality of reference hashes; and when the similarity score exceeds a predetermined threshold, designating the target object as non-malicious.

According to another aspect, a method comprises receiving at a server computer system a plurality of target hashes of a target object of a client computer system connected to the server computer system over a wide area network; generating at the server computer system a server-side indicator of whether the target object is malicious; and sending to the client computer system the server-side indicator of whether the target object is malicious. The plurality of target hashes are generated at the client computer system in response to a tentative determination by the client computer system that the target object is suspected of being malicious, the tentative determination resulting from an initial malware scan of a plurality of target objects of the client computer system. Generating at the server computer system a server-side indicator of whether the target object is malicious comprises: for at least a target hash of the plurality of target hashes, retrieving a plurality of reference hashes of a reference object, the reference object selected from a set of whitelisted objects according to the target hash, and when the plurality of target hashes is not identical to the plurality of reference hashes, determining a similarity score according to a count of hashes common to both the plurality of target hashes and the plurality of reference hashes, and when the similarity score exceeds a predetermined threshold, designating the target object as non-malicious.

According to another aspect, a method comprises receiving at a server computer system a plurality of target hashes of a target object, each target hash representing a distinct code block of the target object, each distinct code block consisting of a sequence of processor instructions of the target object; for at least a target hash of the plurality of target hashes, employing the server computer system to: retrieve a plurality of reference hashes of a reference object, the reference object selected from a set of whitelisted objects according to the target hash, and when the plurality of target hashes is not identical to the plurality of reference hashes, determine a similarity score according to a count of hashes common to both the plurality of target hashes and the plurality of reference hashes; and when the similarity score exceeds a predetermined threshold, employing the server computer system to label the target object as non-malicious.

According to another aspect, a computer system comprises at least a processor programmed to receive a plurality of target hashes, each target hash representing a distinct code block of a target object, each distinct code block consisting of a sequence of processor instructions of the target object; for at least a target hash of the plurality of target hashes: retrieve a plurality of reference hashes of a reference object, the reference object selected from a set of whitelisted objects according to the target hash, and when the plurality of target hashes is not identical to the plurality of reference hashes, determine a similarity score according to a count of hashes common to both the plurality of target hashes and the plurality of reference hashes; and when the similarity score exceeds a predetermined threshold, label the target object as non-malicious.

According to another aspect, a non-transitory computer-readable storage medium encodes instructions which, when executed on a processor, cause the processor to perform the steps of: receiving a plurality of target hashes, each target hash representing a distinct code block of a target object, each distinct code block consisting of a sequence of processor instructions of the target object; for at least a target hash of the plurality of target hashes, retrieving a plurality of reference hashes of a reference object, the reference object selected from a set of whitelisted objects according to the target hash; when the plurality of target hashes is not identical to the plurality of reference hashes, determining a similarity score according to a count of hashes common to both the plurality of target hashes and the plurality of reference hashes. When the similarity score exceeds a predetermined threshold, the target object is non-malicious.

According to another aspect, a computer system comprises: means for receiving a plurality of target hashes, each target hash representing a distinct code block of a target object, each distinct code block consisting of a sequence of processor instructions of the target object; means for retrieving a plurality of reference hashes of a reference object, the reference object selected from a set of whitelisted objects according to a selected target hash of the plurality of target hashes; means for determining a similarity score according to a count of hashes common to both the plurality of target hashes and the plurality of reference hashes; and means for labeling the target object as non-malicious according to the similarity score.

According to another aspect, a method comprises receiving at a server computer system a plurality of target hashes, each target hash representing a distinct data block of a target object, each distinct code block consisting of a sequence of processor instructions of the target object; in response to receiving the plurality of target hashes, retrieving a plurality of reference hashes representing a whitelisted data object, and when the plurality of target hashes is not identical to the plurality of reference hashes, when the plurality of target hashes and the plurality of reference hashes share a majority of items, labeling the target object as non-malicious.

BRIEF DESCRIPTION OF THE DRAWINGS

The foregoing aspects and advantages of the present invention will become better understood upon reading the following detailed description and upon reference to the drawings where:

FIG. 11 shows an exemplary sequence of steps performed by the server anti-malware application of FIG. 5 according to some embodiments of the present invention.

DETAILED DESCRIPTION OF PREFERRED EMBODIMENTS

Figure 1:
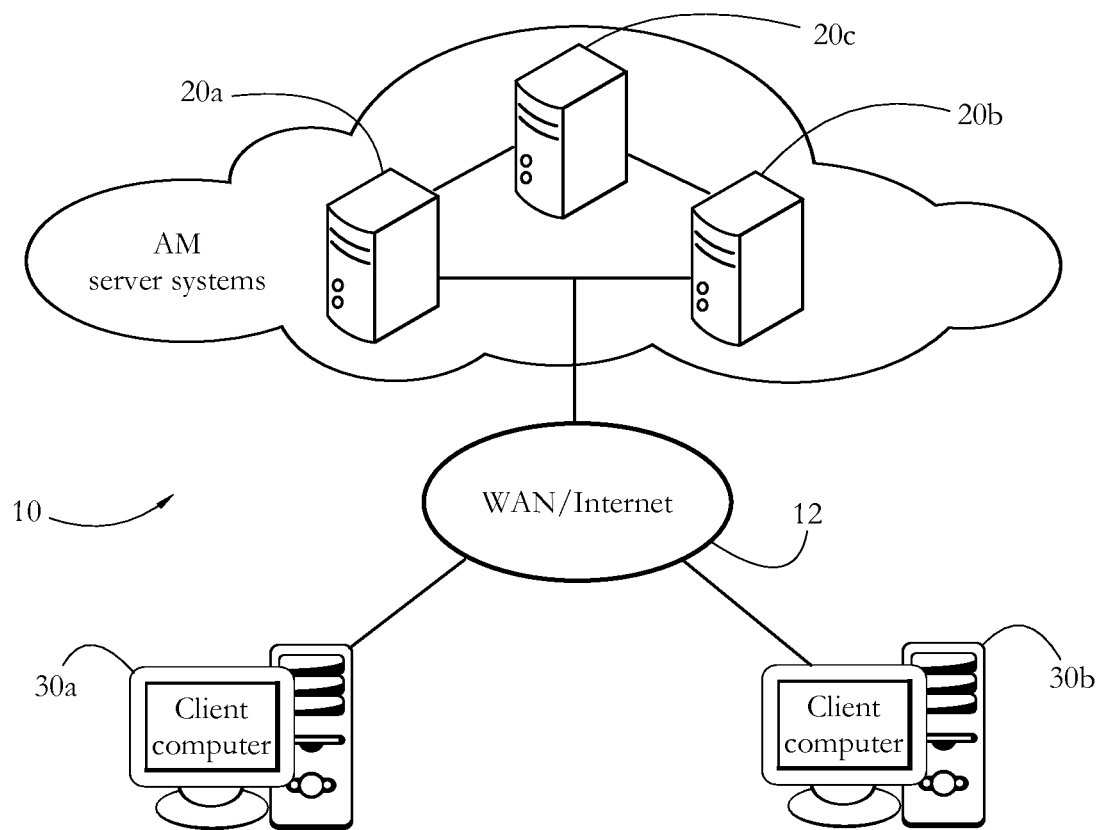
FIG. 1 shows an exemplary anti-malware system according to some embodiments of the present invention.

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer programs described in some embodiments of the present invention may be stand-alone software entities or sub-entities (e.g., subroutines, code objects) of other computer programs. Unless otherwise specified, a target object is a file or a process residing on a client computer system. An identifier of a target object comprises data that allows the selective identification and retrieval of the target object itself, not merely as part of a larger data structure such as the entire memory of a client computer system. Unless otherwise specified, an object data indicator (ODI) of a target object comprises features of the target object data (e.g., a code block, an opcode pattern, a hash) conducive to determining whether the target object is malicious, e.g. infected with malware. Unless otherwise specified, a hash is an output of a hash function. Hash functions are mathematical transformations mapping sequences of symbols (e.g. characters, bits) into shorter sequences of numbers or bit strings. A target hash is a hash computed on data of a target object. Unless otherwise specified, the term whitelisted is understood to mean trusted to be clean, i.e. not containing malware. A first set is identical to a second set when all elements of the first set are contained in the second set, and all elements of the second set are contained in the first set. Computer readable media encompass non-transitory media such as magnetic, optic, and semiconductor storage media (e.g. hard drives, optical disks, flash memory, DRAM), as well as communications links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

FIG. 1 shows an exemplary malware detection system 10 according to some embodiments of the present invention. System 10 comprises a set of anti-malware (AM) server systems 20a-c and a set of client computer systems 30a-b. Client computer systems 30a-b may represent end-user computers each having a processor, memory, and storage, and running an operating system such as Windows®, MacOS® or Linux. Some client computer systems 30a-b may represent mobile computing and/or telecommunication devices such as tablet PCs and mobile telephones. In some embodiments, client computer systems 30a-b may represent individual customers, or several client computer systems may belong to the same customer. In some embodiments, one of systems 30a-b may be a server computer such as a mail server, in which case malware detection services may be used to identify malware present in emails or other messages sent to multiple clients, and to take appropriate action (e.g. remove or quarantine malware-infected items) before the messages are delivered to the clients. A network 12 connects client computer systems 30a-c and anti-malware server systems 20a-c. Network 12 may be a wide-area network such as the Internet. Parts of network 12, for example a part of network 12 interconnecting client computer systems 30a-b, may also include a local area network (LAN).

Figure 2:
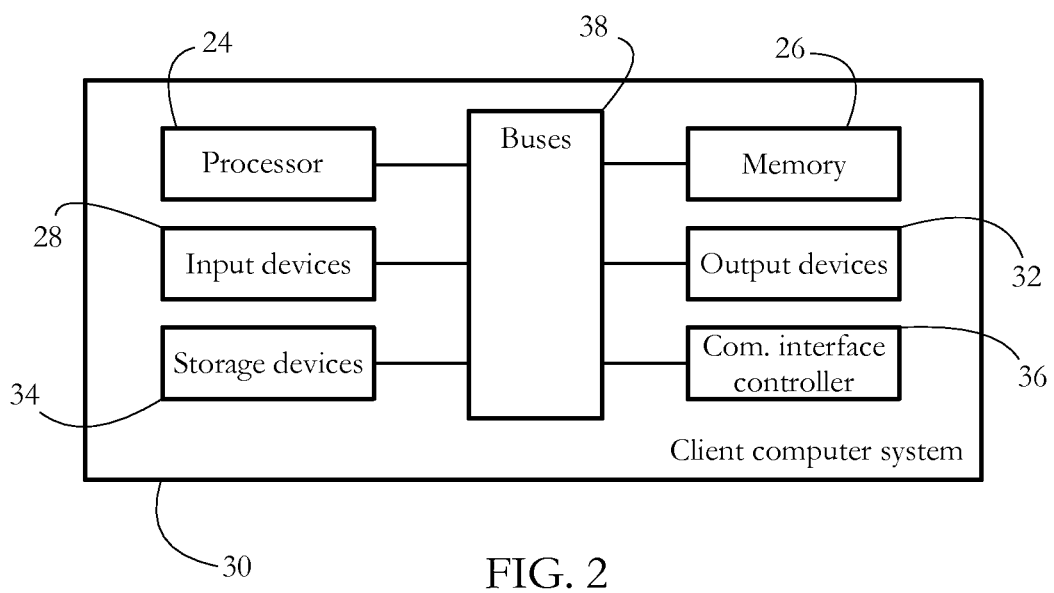
FIG. 2 illustrates an exemplary hardware configuration of a client computer system according to some embodiments of the present invention.

FIG. 2 shows an exemplary hardware configuration of a client computer system 30. In some embodiments, system 30 comprises a processor 24, a memory unit 26, a set of input devices 28, a set of output devices 32, a set of storage devices 34, and a communication interface controller 36, all connected by a set of buses 38.

In some embodiments, processor 24 comprises a physical device (e.g. multi-core integrated circuit) configured to execute computational and/or logical operations with a set of signals and/or data. In some embodiments, such logical operations are delivered to processor 24 in the form of a sequence of processor instructions (e.g. machine code or other type of software). Memory unit 26 may comprise volatile computer-readable media (e.g. RAM) storing data/signals accessed or generated by processor 24 in the course of carrying out instructions. Input devices 28 may include computer keyboards and mice, among others, allowing a user to introduce data and/or instructions into system 30. Output devices 32 may include display devices such as monitors. In some embodiments, input devices 28 and output devices 32 may share a common piece of hardware, as in the case of touch-screen devices. Storage devices 34 include computer-readable media enabling the non-volatile storage, reading, and writing of software instructions and/or data. Exemplary storage devices 34 include magnetic and optical disks and flash memory devices, as well as removable media such as CD and/or DVD disks and drives. Communication interface controller 36 enables system 30 to connect to a computer network and/or to other machines/computer systems. Typical communication interface controllers 36 include network adapters. Buses 38 collectively represent the plurality of system, peripheral, and chipset buses, and/or all other circuitry enabling the inter-communication of devices 24-36 of computer system 30. For example, buses 38 may comprise the northbridge bus connecting processor 24 to memory 26, and/or the southbridge bus connecting processor 24 to devices 28-36, among others.

Figure 3:
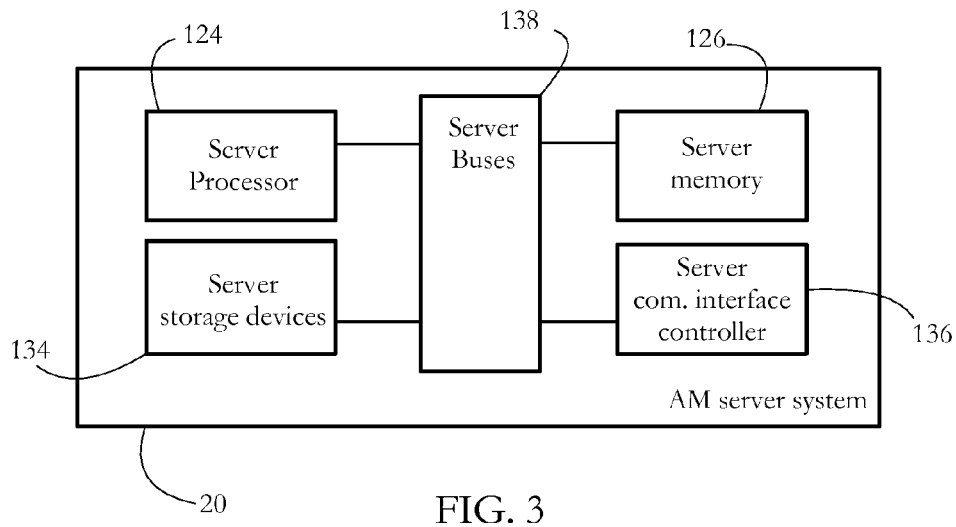
FIG. 3 shows an exemplary hardware configuration of an anti-malware server system according to some embodiments of the present invention.

FIG. 3 shows a hardware configuration of an exemplary AM server system 20 of systems 20a-c, according to some embodiments of the present invention. AM server system 20 may be a computer system comprising a server processor 124, a server memory 126, a set of server storage devices 134, and a server communication interface controller 136, all connected to each other via a set of server buses 138. Although some details of hardware configuration may differ between server system 20 and client computer system 30, the scope of devices 124, 126, 134, 136 and 138 may be similar to that of devices 24, 26, 34, 36 and 38 described above, respectively.

Figure 4:
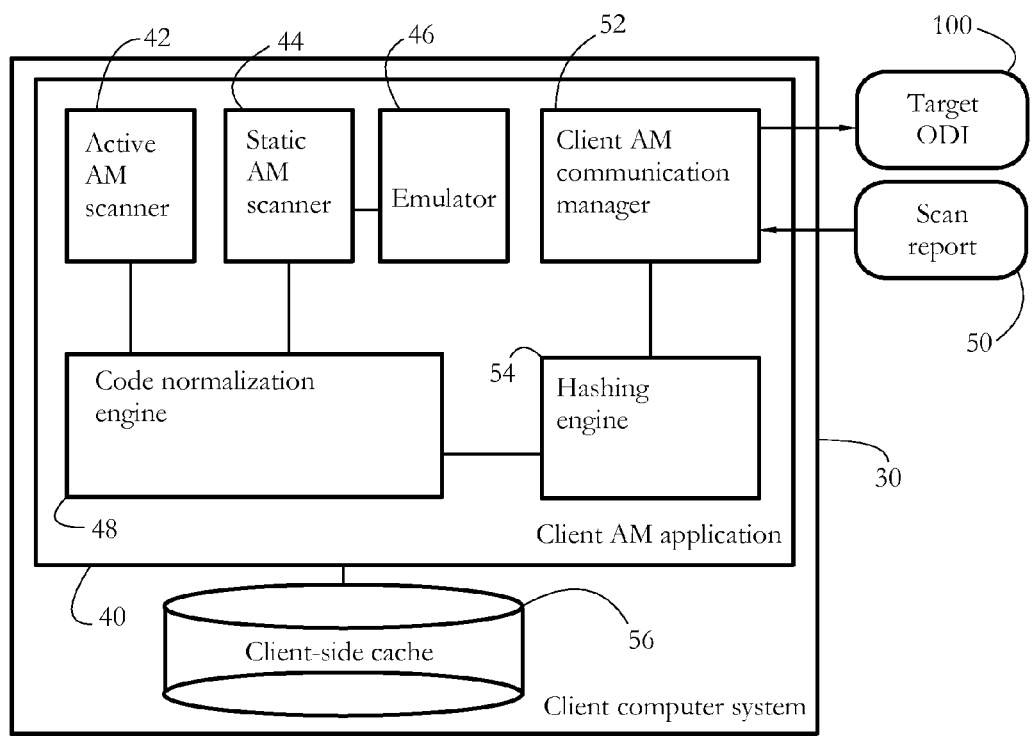
FIG. 4 shows a diagram of an exemplary anti-malware application executing on the client computer system according to some embodiments of the present invention.

Client computer system 30 may include a client anti-malware (AM) application 40 and a client-side cache 56, as shown in FIG. 4. In some embodiments, client AM application 40 may be a stand-alone application, or may be an anti-malware module of a security suite having antivirus, firewall, anti-spam, and other modules. Client AM application may comprise an active AM scanner 42, a static AM scanner 44, an emulator 46 connected to static AM scanner 44, a code normalization engine 48 connected to scanners 42 and 44, a client AM communication manager 52 and a hashing engine 54 connected to communication manager 52 and code normalization engine 48.

In some embodiments, client AM application 40 is configured to conduct a client-side part of a client-server collaborative scan to detect malware stored on computer-readable media forming part of client computer system 30 (e.g. memory, hard drive), or on computer-readable media connected to system 30 (e.g. memory stick, external hard drive, network devices, etc.). As part of a client-server collaborative scan, client AM application 40 is configured to send a target object data indicator (ODI) 100 to AM server systems 20a-c and to receive a scan report 50 from systems 20a-c.

Target objects scanned by AM application 40 include computer files and processes. Each process may include a set of loaded memory modules (i.e. loaded images of a target executable file and its referenced dynamic linked libraries), as well as any additional files corresponding to the loaded memory modules. A target object may be considered malware if it contains at least a part of a malicious software entity (e.g. virus, worm, Trojan).

In some embodiments, ODI 100 comprises a plurality of code block indicators, each code block indicator indicative of a distinct code block of the target object. Exemplary contents and formats of ODI 100 will be discussed in detail in relation to FIGS. 7-9.

In some embodiments, scan report 50 includes an identifier (e.g., tag, file ID) of the target object, a malware status indicator (e.g., infected, clean, unknown) of the target object, and/or a set of identifiers of malware agents infecting the target object, such as names of individual malware agents (e.g., Win32.Worm.Downadup.Gen), malware class indicators (virus, rootkit, etc.), or pointers to the respective agents in a malware knowledgebase. In some embodiments, a single scan report may be compiled for a batch of target objects.

In some embodiments, server communication manager 52 is configured to manage communication with server AM systems 20a-c. For example, manager 52 may establish connections over network 12, send and receive data to/from AM servers 20a-c, maintain a list of ongoing scan transactions, and associate target ODIs 100 with AM servers carrying out the server-side scanning.

Active AM scanner 42 and static AM scanner 44 enable client AM application 40 to run a preliminary anti-malware scan of the target object, as shown in more detail below. If the preliminary scan detects malicious content, the offending target object is reported to the user directly, without having to go through client-server scanning, thus saving time and computer resources. In some embodiments, file target objects are handled by static AM scanner 44, while process target objects are handled by active AM scanner 42. In some embodiments, static AM scanner 44 may use emulator 46 to unpack a file and execute it in a protected environment, apart from main memory. Scanners 42, 44 may use behavior-based methods, various heuristics, content-based methods (e.g. signature matching), or a combination thereof, to determine whether the target object is malware. Examples of heuristic criteria for determining whether a target object is malicious comprise, among others, the relative sizes of various sections in the portable executable (PE) file of the target object, the information density in each section, the presence of specific flags and flag groups in the PE header, information about the packer/protector (if any), and the presence of certain text patterns inside the executable.

Client AM application 40 may employ code normalization engine 48 and hashing engine 54 to produce target ODI 100. The operation of code normalization engine 48 will be discussed below in relation to FIG. 7. Hashing engine 54 is configured to receive an opcode pattern and to generate a hash of the respective opcode pattern, as shown in relation to FIGS. 8-9. In some embodiments, a hash is the output of a hash function, a mathematical transformation mapping a sequence of symbols (e.g. characters, bits) into a sequence of numbers or bit string. Exemplary hash functions employed by hashing engine 54 include cyclic redundancy check (CRC), message digest (MD), or secure hashing (SHA), among others. An exemplary hash is the 4-byte CRC32.

Some embodiments of client-side cache 56 comprise, at any given time, a repository of ODIs corresponding to target objects residing on the respective client system 30, objects having already been scanned for malware. In some embodiments, cache 56 may comprise a set of hashes of target object ODIs; each ODI received from client systems 30 may be hashed, with duplicate hashes removed, and resulting hashes stored as unique indicators of the respective ODIs. Cache 56 allows for a speed-up of malware scanning. If the ODI or hash thereof of a target object is found in client cache 56, indicating that the respective target object has already been scanned at least once, the malware status of the target object may be retrieved directly from cache 56 and reported to the user, a process considerably faster than performing a new scan of the target object. For every ODI, some embodiments of cache 56 may comprise an object identifier (e.g., tag, file ID), and an indicator of malware status of the respective target object.

Figure 5:
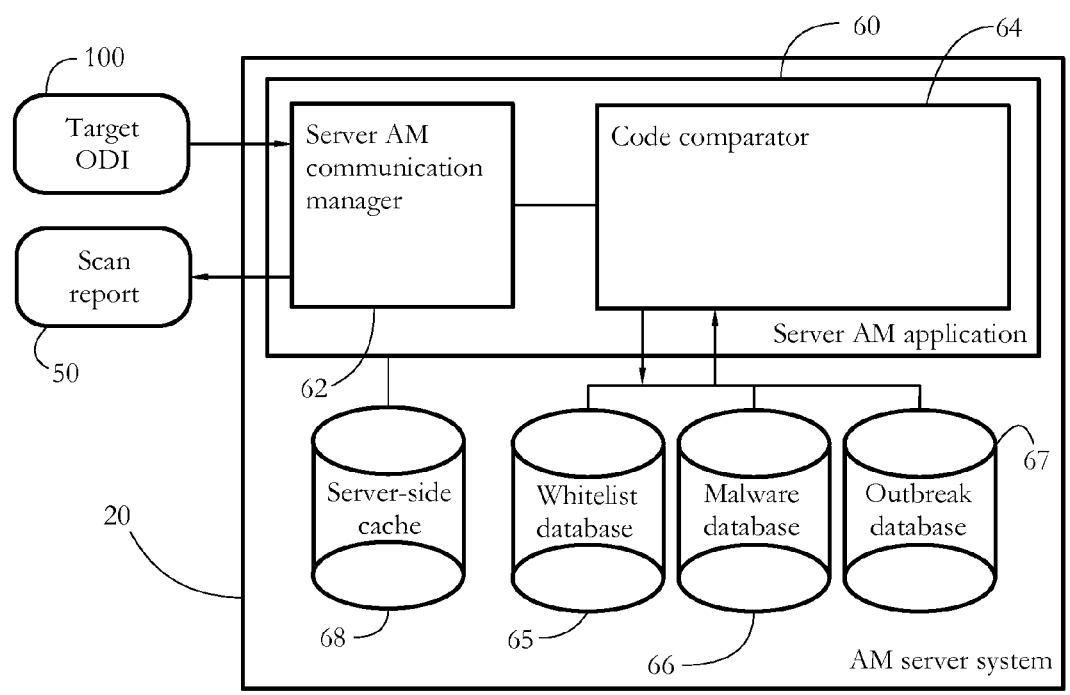
FIG. 5 shows exemplary applications executing on the anti-malware server system according to some embodiments of the present invention.

FIG. 5 shows exemplary applications executing on AM server system 20 according to some embodiments of the present invention. In some embodiments, system 20 comprises a server AM application 60, a server-side cache 68, a whitelist database 65, a malware database 66, and an outbreak database 67b, all connected to AM server application 60.

In some embodiments, AM server application 60 is configured to perform a plurality of malware detection transactions with client computer systems 30a-b. For each such transaction, server AM application 60 is configured to conduct a server-side part of a collaborative scan to detect malware residing on the respective client computer system, as described in detail below. As part of a client-server transaction, application 60 receives target ODI 100 from the client computer system, and transmits scan report 50 to the respective client computer system. Server AM application 60 may comprise a server AM communication manager 62 and a code comparator 64 connected to communication manager 62.

In some embodiments, server communication manager 62 is configured to manage communication with client computer systems 30a-b. For example, manager 62 may establish connections over network 12, send and receive data to/from clients, maintain a list of ongoing scan transactions, and associate target ODIs 100 with originating client computer systems 30a-b. Code comparator 64 is configured to compute a similarity score indicating a degree of similarity between a target object and a set of reference objects stored in databases 65-67, as described in detail below.

In some embodiments, server-side cache 68 comprises a repository of ODIs of target objects having already been scanned for malware, ODIs received from various client computer systems 30a-b in the course of previous client-server collaborative scans. As discussed further below, if the ODI of a target object is found in server cache 68, indicating that the respective target object has already been scanned at least once, the malware status (e.g. clean, infected, etc.) of the target object may be retrieved from cache 68 without performing a new scan of the target object. Along with target ODIs, some embodiments of server cache 68 may store the malware status (e.g. clean, infected) of the respective target object.

Databases 65-67 are maintained as repositories of current malware-related knowledge. In some embodiments, each database 65-67 comprises a set of data indicators corresponding to a collection of reference objects (files and processes) of known malware status. In some embodiments, databases 65-67 store data in the form of opcode pattern hashes (described further below in relation to FIGS. 7-10). Whitelist database 65 includes a set of hashes retrieved from objects which are trusted to be clean (i.e., whitelisted items). Malware database 66 comprises malware-identifying hashes retrieved from objects known as malware. In some embodiments, outbreak database 67 comprises hashes computed for objects which are of unknown malware status (not yet recognized as malware or clean).

In some embodiments, all opcode pattern hashes stored in databases 65-67 have the same size (e.g. 4 bytes). They may be stored sequentially in the memory and/or computer-readable media of server systems 20a-c. In some embodiments, a second data structure comprising object identifiers (e.g., file IDs also represented as 4 byte numbers) is stored alongside the set of reference hashes. A bi-directional mapping stored in the memory of the respective AM server is used to relate each hash to the file ID of the object it was retrieved from. This allows server AM application to selectively retrieve reference hashes, to determine whether target objects received from client computer systems are similar to any reference objects stored in databases 65-67. Databases 65-67 are being kept up-to-date by addition of target object data received from client computer systems 30a-b, as further described below.

Figure 6:
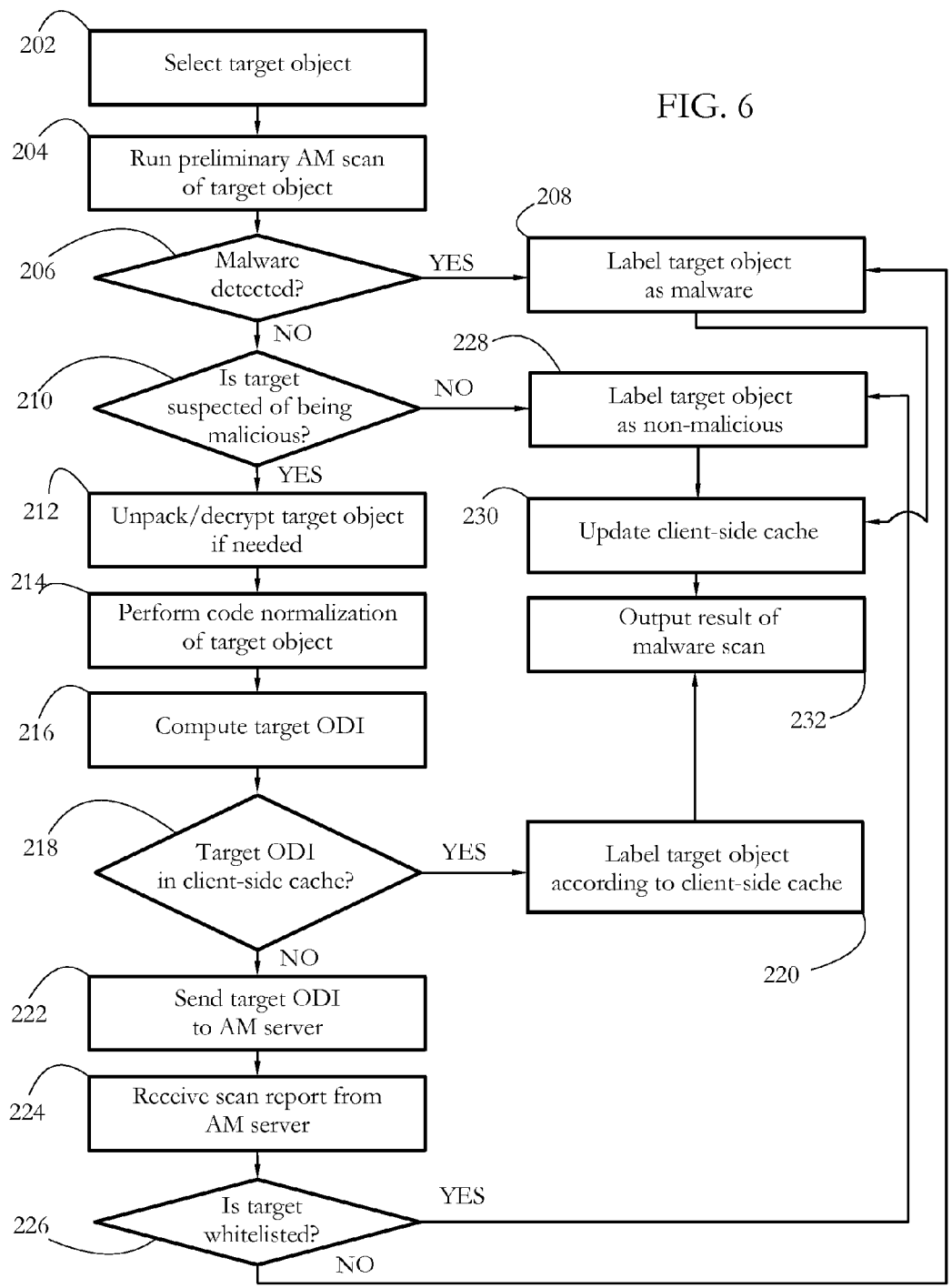
FIG. 6 illustrates an exemplary sequence of steps performed by the client anti-malware application of FIG. 4 according to some embodiments of the present invention.

FIG. 6 shows an exemplary sequence of steps performed by client AM application 40 according to some embodiments of the present invention. In a step 202, application 40 selects a target object to scan for malware. In some embodiments, target objects may be specified directly or indirectly by a user (on-demand scanning). For example, the user may instruct AM application 40 to scan a certain file, or the contents of a certain folder, or the contents stored on a certain computer-readable medium (e.g. CDROM, flash memory device). Other exemplary target objects are selected during on-access scanning, wherein application 40 is configured to scan certain types of files or processes before reading/loading/launching them. In some embodiments, a set of target objects may be compiled for the purpose of a scheduled scan of the client computer system running application 40. Such an exemplary set of target objects residing on a client system running Microsoft Windows® may include executable files from the WINDIR folder, executables from the WINDIR/system32 folder, executables of the currently running processes, dynamic link libraries (DLL) imported by the currently running processes, and executables of all installed system services, among others. In some embodiments, target objects may also include files/processes targeted by malware programs of interest, for example malware programs considered most widespread and active at the time of initiation of the respective malware scan.

In some embodiments, an identifier (e.g., file ID) is used to uniquely tag the respective target object. The identifier comprises data allowing a selective identification of the target object itself (e.g., a file or process), and not as part of a larger structure such as e.g. the entire memory of the respective client computer system. Exemplary target object identifiers comprise file paths and memory addresses, among others. The identifier also allows client AM application 40 to selectively retrieve the target object, in order to compute target ODI 100, as well as to unambiguously perform client-server scan transactions with multiple target objects.

In a step 204 (FIG. 6), client AM application 40 may run a preliminary anti-malware scan of the target object. In some embodiments, file target objects are handled by static AM scanner 44, while process target objects are handled by active AM scanner 42. Scanners 42, 44 may use behavior methods (e.g., emulation), various heuristics (e.g., the geometry of a portable executable header of the target object), content-based methods (e.g. signature matching), or a combination thereof, to determine whether the target object is malware. In some embodiments, scanners 42, 44 may produce an indicator of the malware status of the target object. Exemplary status indicators include malicious, suspected of being malicious, and clean, among others.

In some embodiments, a target object may be suspected of being malicious when the target object has some features in common with known malicious objects, but not enough to be considered malware. Exemplary suspicious features include the presence within the PE header of the target object of certain values/value pairs, the presence within the target object of certain code sequences (e.g., code that checks whether the target object is executing within a virtual environment), and the presence of malware-identifying text patterns (signatures) such as common passwords and names and/or path indicators of anti-malware software, among others. Other suspicious features may comprise certain malware-identifying behavior patterns of the target object.

In some embodiments, scanners 42, 44 compute a malware score for the respective target object, wherein each malware-identifying feature may be given a specific weight. When the malware score exceeds a first threshold, the respective target object may be suspected of being malicious; when the score exceeds a second, higher threshold, the target object may be labeled as malware. An exemplary target object containing strings specific to the IRC protocol, names of antivirus programs, common Windows® passwords, and code sequences specific to exploits may receive a comparatively high malware score, and may therefore be labeled malware, while another exemplary target object, which only contains the names of some anti-malware applications, may receive a relatively low score, but may still be suspected of being malicious.

In a step 206, application 40 determines whether the target object is malicious according to the preliminary malware scan. If no, the operation of application 40 proceeds to a step 210 described below. If yes, in a step 208, AM application 40 labels the target object as malware and updates client-side cache 56 accordingly, in a step 230. Next, client AM application 40 outputs the result of the malware scan in a step 232.

In some embodiments, step 232 may comprise issuing an alert (e.g., a pop-up window) to inform the user that the respective client computer system may be infected. Alternatively, application 40 may document the malware scan in a system log. Some embodiments of AM application 40 may display a scan report to the user, the report comprising, among others, the name (or object identifier) of the target object, an indicator of the type of malware detected, and additional information regarding the respective malware (e.g. possible cleanup methods).

In step 210, client AM application 40 may determine whether the target object is suspected of being malicious according to a result of the preliminary scan (see step 204 above). If yes, the operation proceeds to a step 212 discussed below. If no, in a step 228, application 40 may label the target object as non-malicious (clean) and proceed to step 230.

In step 212, when the target object is a file, application 40 may load the target file in a protected environment provided by emulator 46, to remove any layers of packing and/or encryption protecting the code of the target object. When the target object is a process, the operation of application 40 may skip step 212, since the target object will already be loaded into system memory.

In a step 214, code normalization engine 48 performs a code normalization of the target object. Compilers can generate different machine code from the same block of source code depending on the compilation parameters used, particularly due to code optimization. Additional code variations may be introduced by protector/polymorphic malware. In some embodiments, code normalization comprises transforming the set of processor instructions forming the target object into a standardized set of processor instructions, to remove variations of computer code introduced by compilation and/or other polymorphisms. An exemplary code normalization operation may proceed as follows:

1. The compiler used to build the target object is detected according to certain features of the target object. When the compiler is known, a location of the object-specific code inside the memory image of the target object is determined. When the compiler cannot be determined, the target areas for code extraction are selected so as to cover as many potential object-specific code locations as possible (e.g., entry point, beginning of first section, beginning of all sections etc.).

2. Code disassembly begins at the location found in the previous step. In some embodiments, code disassembly follows code branches (e.g., JMP/Jxx/CALL in x86 code). The disassembled instructions are processed in sequence. As part of the normalization process, some instructions are left unchanged and others are altered. Exemplary alterations include:

a. register IDs are replaced, based on the order in which they appear inside the function block;
b. constant values and offsets are eliminated;
c. PUSH followed by POP sequences are replaced with MOV instructions;
d. Sequences which set the value of a variable/register/memory address to 0 (e.g. XOR <item>, <item>) are replaced with MOV <item>, 0;
e. Addition/subtraction of 1 or 2 is replaced with one or two INC/DEC instructions, respectively.
f. JZ/JNZ instructions are replaced with JE/JNE instructions, respectively;
g. Function prologues and epilogues are removed;
h. Instruction classes CMP, MOV and TEST are removed;

i. Non-operations (ADD and SUB with 0; NOP etc.) are removed.

Figure 7:
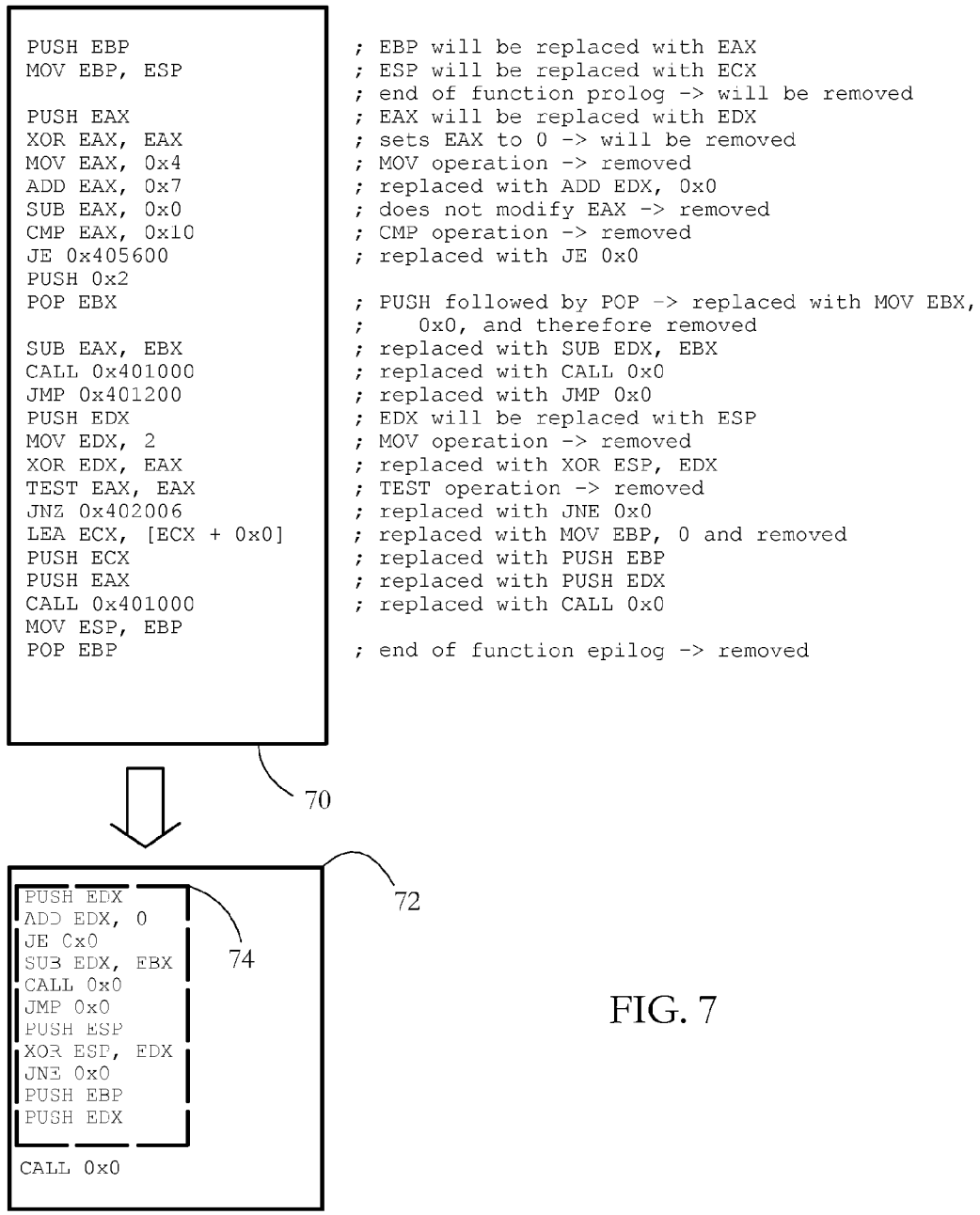
FIG. 7 shows an example of code normalization according to some embodiments of the present invention.

FIG. 7 shows an example of code normalization, according to some embodiments of the present invention. A fragment of code disassembled from an exemplary target object comprises a function block 70. In some embodiments, function blocks start with a PUSH EBP; MOV EBP, ESP instruction sequence and they end with POP EBP. Each line of code (processor instruction) from function block 70 is modified according to the prescription listed on the right, to produce a corresponding normalized function block 72.

In a step 216 (FIG. 6), client AM application 40 computes an object data indicator (ODI) of the target object. In some embodiments, the ODI comprises a plurality of code block indicators, each code block indicator indicative of a distinct code block of the target object. An exemplary code block indicator comprises an opcode pattern of the respective code block.

In some embodiments, a code block comprises a sequence of consecutive processor instructions, the sequence extracted from the normalized code of the target object. In some embodiments, code blocks comprise a predetermined, code-independent number of instructions. Alternatively, the count of instructions within a code block varies within a predetermined range. Exemplary code blocks comprise between 5 and 50 contiguous instructions. In some embodiments, the size (e.g., number of instructions) of code blocks is substantially smaller than the size of function blocks, so that a function block may comprise more than one code block. In some embodiments, code blocks start either at the start of a function block, or at a CALL instruction. An exemplary code block 74 is shown in FIG. 7.

Figure 8:
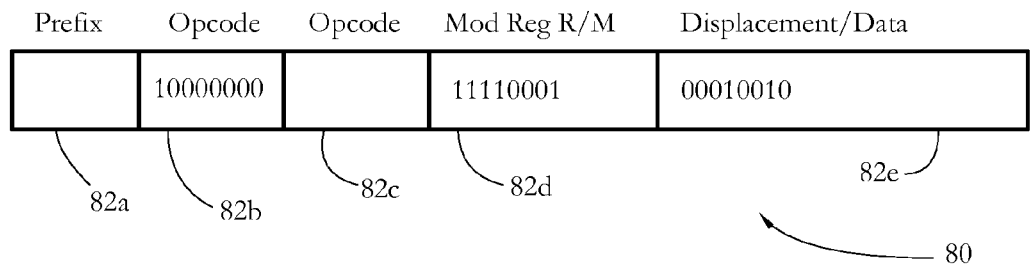
FIG. 8 shows an exemplary memory representation of a processor instruction according to some embodiments of the present invention.

In some embodiments, step 216 comprises separating the target object into code blocks, and extracting a set of opcode indicators from each such code block. FIG. 8 shows an exemplary binary memory representation of a processor instruction 80 (illustrated for the Intel® x86, 32 bit family of processors). In some embodiments, each processor instruction is stored in memory as a sequence of bytes, the sequence comprising a set of instruction fields, such as a Prefix field 82a, a couple of Opcode fields 82b-c, a Mod/Reg/R/M field 82d, and a Displacement/Data field 82e. In some embodiments, Opcode fields 82b-c encode the type of instruction (e.g., MOV, PUSH, etc.), while fields 82a, 82d-e encode various instruction parameters (e.g. register names, memory addresses, etc.). In some embodiments, such as the x86 format, the byte size and content of instruction fields are instruction-dependent, and therefore the instructions for the x86 architecture are of varying lengths. The instruction illustrated in FIG. 8 (XOR CL, 12H) comprises only the first Opcode byte (10000000 for XOR), the Mod/Reg/R/M byte (11110001 for register CL), and the Displacement/Data byte (00010010 is binary for 12H), while other instructions may comprise both opcode fields, or other combinations of Prefix, Opcode, Mod, Reg and/or Data fields.

Figure 9:
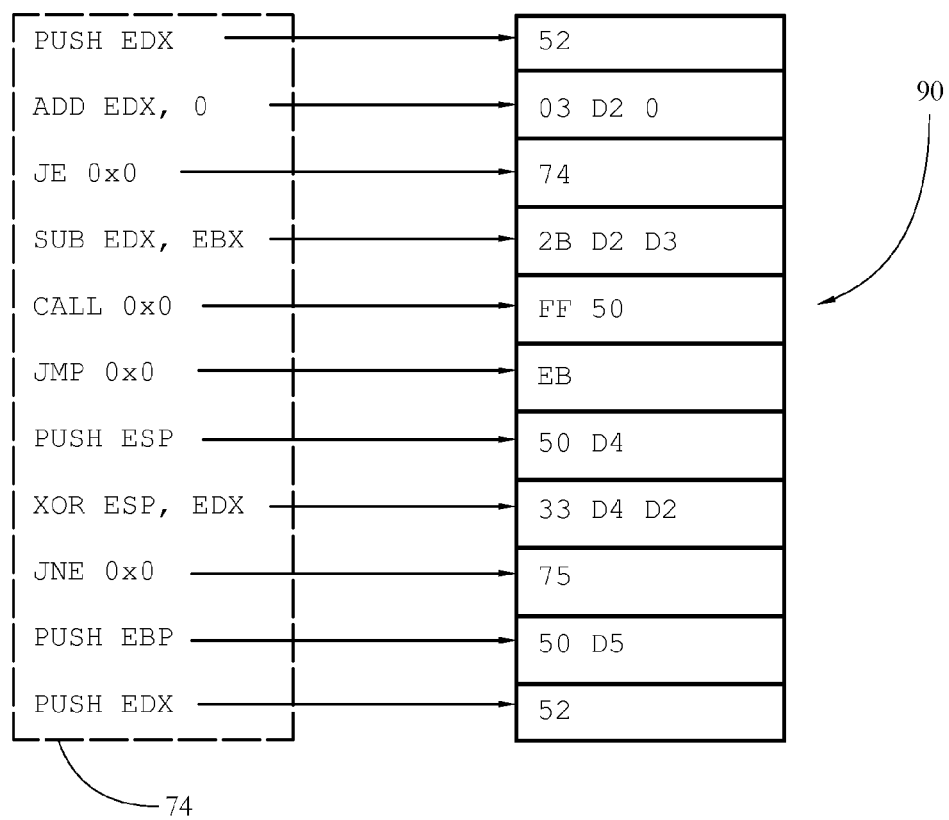
FIG. 9 shows an exemplary code block and an exemplary opcode pattern corresponding to the code block according to some embodiments of the present invention.

FIG. 9 shows an exemplary opcode pattern 90 corresponding to code block 74. In some embodiments, opcode pattern 90 is a data structure (e.g. byte sequence, list, etc.) comprising a set of opcode indicators 92, each opcode indicator corresponding to a processor instruction of normalized code block 74. Exemplary opcode indicators 92 comprise the contents of the Opcode fields of the respective processor instruction, in which case opcode pattern 90 comprises a sequence of instruction types making up the respective code block. In the embodiment illustrated in FIG. 9, each opcode indicator 92 comprises a combination of opcode bytes and parameter bytes (for example, the opcode indicator for instruction PUSH EDX is 52 in hex).

Figure 10:
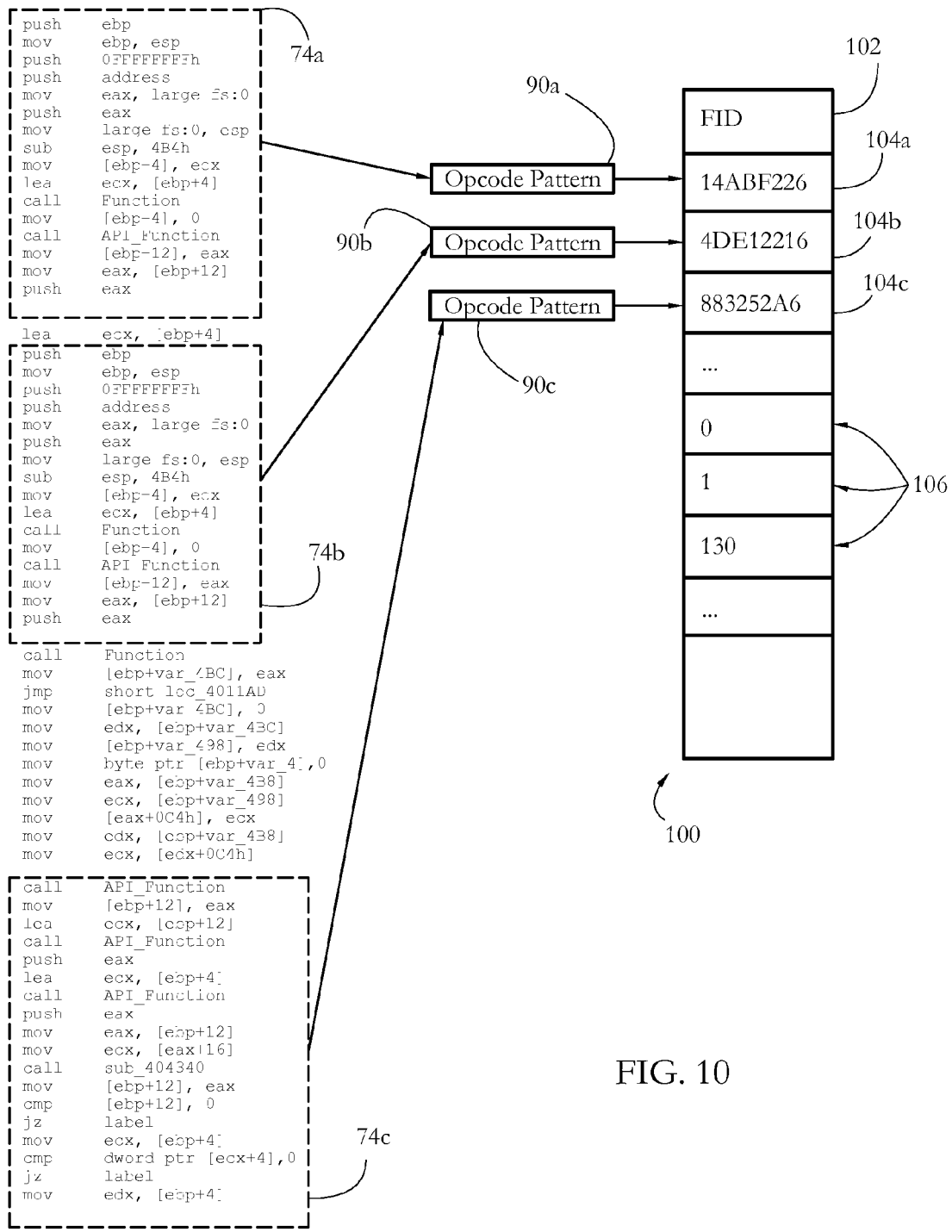
FIG. 10 illustrates an exemplary fragment of code comprising a plurality of code blocks and an exemplary object data indicator (ODI) corresponding to the fragment of code, according to some embodiments of the present invention.

FIG. 10 illustrates a fragment of normalized code and an exemplary ODI 100 of the fragment, according to some embodiments of the present. ODI 100 comprises a plurality of codeblock indicators 104a-c, each codeblock indicator providing a digest (e.g., fingerprint, signature) of a respective code block 74a-c. An exemplary codeblock indicator 104a-c comprises the respective opcode pattern 90a-c. In some embodiments, codeblock indicators 104a-c comprise hashes of opcode patterns 90a-c, respectively, as illustrated in FIG. 10. Beside codeblock indicators 104a-c, some embodiments of ODI 100 may comprise an object identifier 102 (e.g. a file ID) tagging the respective target object, and/or a set of object feature indicators 106 of the target object. Exemplary object feature indicators comprise a file size (e.g. 130 kB), an indicator of file type (e.g. whether a file is an executable, a DLL, etc.), a memory address of the target object, and a set of numbers indicating an outcome of a set of anti-malware heuristic tests (e.g., whether the target object displays certain malware-specific behaviors or content), among others. In some embodiments, object feature indicators 106 may be computed by AM scanners 42-44, e.g. during the preliminary scan of the target object (step 202).

For simplicity, the rest of the Specification will assume that codeblock indicators 104a-c comprise hashes of opcode patterns 90a-c. Execution of step 216 (FIG. 6) then proceeds as follows. Client AM application 40 may separate the target object into distinct code blocks (illustrated by code blocks 74a-c in FIG. 10). For each code block 74a-c, application 40 may proceed to calculate an opcode pattern 90a-c, respectively, as shown in FIG. 9. Application 40 may then invoke hashing engine 54 to compute a hash of opcode pattern 90a-c, to produce the respective codeblock indicator (i.e., target hash) 104a-c. Hashing engine 54 may employ a hashing algorithm such as cyclic redundancy check (CRC), message digest (MD), or secure hashing (SHA), among others.

After computing target ODI 100, in a step 218 (FIG. 6), client AM application 40 performs a lookup of the ODI in client-side cache 56. If the ODI matches a cache record (cache hit), indicating that the respective target object has already been scanned for malware at least once, application 40 proceeds to a step 220, to label the target object according to the cache record (e.g., clean or malware), and advances to step 232 discussed above.

If target ODI 100 is not matched in client-side cache 56, in a step 222 application 40 may invoke client AM communication manager 52 to initiate a client-server scanning transaction. Communication manager 52 transmits target ODI 100 to AM servers 20a-c, and in a step 224 receives scan report 50 from servers 20a-c. In some embodiments, each ODI may form part of a distinct client-server scanning transaction, or multiple ODIs may be transmitted simultaneously, within the same transaction (batch processing).

In a step 226, application 40 determines whether the target object is whitelisted (clean) according to scan report 50. If yes, the target object is labeled as non-malicious (step 228). If the target object is malicious according to scan report 50, application 40 labels the target object as malware (step 208).

FIG. 11 shows an exemplary sequence of steps performed by server AM application 60 (FIG. 5) according to some embodiments of the present invention. In a step 302, server AM communication manager 62 receives target ODI 100 from client computer system 30. In a step 304, application 60 performs a lookup of ODI 100 in server-side cache 68. If the ODI matches a cache record (cache hit), indicating that the respective target object has already been scanned for malware at least once, application 60 proceeds to a step 306, to label the target object according to the cache record (e.g., clean or malware). In a step 308, communication manager 62 compiles scan report 50 and transmits report 50 to the respective client computer system 30.

If no record of ODI 100 is found in server-side cache 68, in a step 310 server AM application 60 filters the hashes of ODI 100 to produce a relevant subset of hashes. In some embodiments, hashes of opcode patterns which are not object-specific may be discarded from ODI 100 to improve the performance of malware scanning. Such non-specific opcode patterns correspond for example to unpacker code (e.g. installer, self-extractor) and/or library code, or are present in both clean and malware objects.

In a step 312, for each hash of ODI 100, server AM application 60 may query whitelist database 65 to retrieve a set of whitelisted reference objects containing the respective hash. In some embodiments, a heap-based algorithm is used to rank the retrieved reference objects according to their similarity with the target object.

In a step 314, server AM application 60 invokes code comparator 64 to compute a similarity score characterizing how similar the target object is to each whitelisted reference object retrieved in step 312. In some embodiments, the similarity score is computed according to the formula:

$$S = 100 * \frac{c}{\max(N_T + N_R)}, \quad [1]$$

wherein C denotes the number (count) of hashes common to both the target object and the respective reference object, $N_T$ denotes the number (count) of hashes of the target ODI, filtered as discussed in step 310 above, and wherein $N_R$ denotes the number (count) of hashes of the reference object.

Alternative embodiments may compute the similarity score according to formulas such as:

$$S = 200 * \frac{c}{N_T + N_R} \quad [2]$$

or $$S = 50 * \left(\frac{c}{N_T} + \frac{c}{N_R}\right). \quad [3]$$

In a step 316, application 60 compares the similarity score (e.g., formula [1]) to a predetermined threshold. When the similarity score exceeds the threshold, indicating that the target object is similar to at least one whitelisted object, some embodiments of server AM application 60 may label the target object as non-malicious (clean) in a step 318. An exemplary value of the whitelisting threshold is 50, indicating that a target object is whitelisted when it shares more than 50% of its opcode patterns with a whitelisted object.

Next, a step 320 updates whitelist database 65 with a record of the current target object, and a step 322 updates server-side cache 68 with a record of the target object and an indicator of the scan result (e.g., clean).

When the whitelisting similarity score (step 318) does not exceed the threshold, indicating that the target object is not sufficiently similar to any known whitelisted object, server AM application moves on to a step 324, wherein target ODI 100 is compared to a set of records of malware objects. In some embodiments, the set of hashes of ODI 100 is further filtered to remove all hashes which matched records from whitelist database 65 (see step 312 above), therefore retaining a subset of hashes which are not found in any known whitelisted object. For each such unrecognized hash of the target object, code comparator 64 may query malware and/or outbreak databases 66-67 to retrieve a set of malware objects containing the respective hash. In a step 326, code comparator 64 may then proceed to compute a malware similarity score indicating how similar the target object is to each such malware object. In some embodiments, code comparator 64 uses any of the formulae [1-3] described above to compute the malware similarity score.

A step 328 compares the malware similarity score to a preset threshold. When the malware similarity score exceeds the threshold, indicating that the target object is similar to at least one malware object stored in databases 66-67, in a step 330 the target object is labeled as malware. An exemplary threshold for classification as malware is 70 (i.e., the target object shares at least 70% of opcode patterns with a known malware object). Next, malware and/or outbreak databases 66-67 are updated to include a record of the target object. Server-side cache 68 is updated to include a record of the target object and an indicator of its malware status (e.g., infected), and a scan report is compiled and transmitted to the client computer system (step 308).

When the malware similarity score does not exceed the threshold, indicating that the target object is not similar to known malware objects, some embodiments of server AM applications may label the target object as whitelisted/non-malicious (step 318), and update whitelist database 65 accordingly.

Target ODI 100 may also trigger a malware outbreak alert. In some embodiments, server AM application 60 counts the reference objects from outbreak database 67, objects which are similar to the target object and have been received by AM server systems 20a-c within a predetermined timeframe (e.g., the latest 6 hours). When the count exceeds a threshold (e.g., 10), a malware outbreak is assumed and the target object, as well as all reference objects similar to it, are marked as infected. Malware and/or outbreak databases 66-67 are then updated accordingly.

The exemplary systems and methods described above allow an anti-malware system to maintain a flexible whitelist database, and to use the whitelist database to improve the malware detection performance.

In conventional whitelisting applications, a hash of a target object (computer file or process) is compared to a set of hashes corresponding to whitelisted objects (objects trusted to be clean). If the hash of the target object matches a whitelisted hash, indicating that the target object is identical to at least one of the whitelisted objects, the target object is trusted and e.g., allowed to execute. Due to certain mathematical properties of hash functions, conventional whitelisting does not allow for variations in the code of whitelisted objects: if two objects differ by as little as one bit, the hashes of the two objects no longer match. Meanwhile, legitimate computer files and processes may display substantial variations, due for example to differences between compilers or between successive versions of the same software.

Some embodiments of the systems and methods described above allow an anti-malware system to account for benign differences between data objects, such as differences introduced by compilers and other polymorphisms. A target object is separated into a multitude of code blocks, and a hash is calculated for each code block. The obtained set of target hashes is then compared against a database of hashes corresponding to code blocks extracted from whitelisted objects. A target object may be labeled as whitelisted (trusted) if it has a substantial number of hashes in common with a whitelisted object. Objects which are slightly different from known whitelisted objects may still receive whitelisting status. By allowing a certain degree of mismatch between the sets of hashes of distinct objects, some embodiments of the present invention increase the efficiency of whitelisting without an unacceptable decrease in data safety.

The size of a code block may be decided according to several criteria. Small code blocks (e.g., a few processor instructions each) may lead to a large number of hashes per target object, which may increase the storage and processing load of the anti-malware server and slow down scanning. On the other hand, small code blocks offer a significant degree of flexibility: if two objects differ only slightly, the differences will be picked up only by a small fraction of hashes, producing a high similarity score. Large code blocks (e.g., several hundreds of processor instructions) produce on average fewer (e.g. several) hashes per target object, and therefore are advantageous from a storage and processing perspective. However, large code blocks suffer the same disadvantage as conventional hashing: small differences between two objects may be picked up by a large proportion of hashes, producing a low similarity score. Testing revealed an optimal code block size of between 5 and 50 processor instructions, and in particular about 5-15 (e.g. ~10) instructions, in some embodiments.

The exemplary systems and methods described above allow an anti-malware system to conduct a collaborative client-server scanning transaction, and to assess the malware status of the target object according to the results of the server-side scan of the target object. Conducting a part of the malware scan on a remote anti-malware server has a number of advantages over local scanning of target objects on a client computer system.

The proliferation of malware agents and software in general has contributed to a steady increase in the size of whitelist and malware hash databases, which may amount to several megabytes to several gigabytes of data. The exemplary methods and systems described above allow storing the hash databases on the anti-malware server, thus avoiding the delivery of data-heavy software updates from a corporate server to a large number of customers on a regular basis.

By performing a significant fraction of malware scanning centrally on the server, the systems and methods described above allow for the timely incorporation of hashes of newly detected malware and of new legitimate software. By contrast, in conventional malware detection wherein scanning is predominantly distributed to client computer systems, information gathering about new security threats and new whitelisted software may involve indirect methods, taking significantly longer to reach the anti-malware software producers.

The size of files exchanged between client and anti-malware server systems described above is kept to a minimum. Instead of sending entire target objects from the client to the server for server-side scanning, the exemplary methods and systems described above are configured to exchange hashes, which may amount to several bytes to several kilobytes per target object, thus significantly reducing network traffic.

It will be clear to one skilled in the art that the above embodiments may be altered in many ways without departing from the scope of the invention. Accordingly, the scope of the invention should be determined by the following claims and their legal equivalents.

What is claimed is:

1. A method comprising:
performing at a client computer system an initial malware scan of a plurality of target objects of the client computer system; and
in response to a tentative determination by the initial malware scan that the target object is suspected of being malicious:
generating at the client computer system a plurality of target hashes of the target object, each target hash representing a distinct code block of the target object, each distinct code block consisting of a sequence of processor instructions of the target object;
sending from the client computer system the plurality of target hashes to a server computer system connected to the client computer system over a wide area network; and
receiving at the client computer system from the server computer system a server-side indicator of whether the target object is malicious, wherein the server-side indicator is generated by the server computer system by:
for at least a target hash of the plurality of target hashes, retrieving a plurality of reference hashes of a reference object, the reference object selected from a set of whitelisted objects according to the target hash, and when the plurality of target hashes is not identical to the plurality of reference hashes, determining a similarity score according to a count of hashes common to both the plurality of target hashes and the plurality of reference hashes; and
when the similarity score exceeds a predetermined threshold, designating the target object as non-malicious.

2. The method of claim 1, wherein generating the server-side indicator by the computer server system comprises:
when the similarity score does not exceed the predetermined threshold, generating a filtered set of target hashes of the target object by filtering all target hashes which appear in a database of clean hashes out of the plurality of target hashes of the target object; and
comparing the filtered set of target hashes to a database of malware-identifying hashes specific to malware.

3. The method of claim 1, wherein generating the server-side indicator by the computer server system comprises:
when the similarity score does not exceed the predetermined threshold, generating a filtered set of target hashes of the target object by filtering all target hashes which appear in a database of clean hashes out of the plurality of target hashes of the target object; and
comparing the filtered set of target hashes to a database of outbreak-detection hashes specific to unknown objects reported within a predetermined recent period by a plurality of distinct client computer systems connected to the server computer system.

4. A method comprising:
receiving at a server computer system a plurality of target hashes of a target object of a client computer system connected to the server computer system over a wide area network, wherein the plurality of target hashes are generated at the client computer system in response to a tentative determination by the client computer system that the target object is suspected of being malicious, the tentative determination resulting from an initial malware scan of a plurality of target objects of the client computer system;

generating at the server computer system a server-side indicator of whether the target object is malicious by:
for at least a target hash of the plurality of target hashes, retrieving a plurality of reference hashes of a reference object, the reference object selected from a set of whitelisted objects according to the target hash, and when the plurality of target hashes is not identical to the plurality of reference hashes, determining a similarity score according to a count of hashes common to both the plurality of target hashes and the plurality of reference hashes, and
when the similarity score exceeds a predetermined threshold, designating the target object as non-malicious; and
sending to the client computer system the server-side indicator of whether the target object is malicious.

5. The method of claim 4, wherein generating the server-side indicator by the computer server system comprises:
when the similarity score does not exceed the predetermined threshold, generating a filtered set of target hashes of the target object by filtering all target hashes which appear in a database of clean hashes out of the plurality of target hashes of the target object; and
comparing the filtered set of target hashes to a database of malware-identifying hashes specific to malware.

6. The method of claim 4, wherein generating the server-side indicator by the computer server system comprises:
when the similarity score does not exceed the predetermined threshold, generating a filtered set of target hashes of the target object by filtering all target hashes which appear in a database of clean hashes out of the plurality of target hashes of the target object; and
comparing the filtered set of target hashes to a database of outbreak-detection hashes specific to unknown objects reported within a predetermined recent period by a plurality of distinct client computer systems connected to the server computer system.

7. A method comprising:
receiving at a server computer system a plurality of target hashes of a target object, each target hash representing a distinct code block of the target object, each distinct code block consisting of a sequence of processor instructions of the target object;
for at least a target hash of the plurality of target hashes, employing the server computer system to:
retrieve a plurality of reference hashes of a reference object, the reference object selected from a set of whitelisted objects according to the target hash, and
when the plurality of target hashes is not identical to the plurality of reference hashes, determine a similarity score according to a count of hashes common to both the plurality of target hashes and the plurality of reference hashes; and
when the similarity score exceeds a predetermined threshold, employing the server computer system to label the target object as non-malicious.

8. The method of claim 7, wherein the target hash comprises a hash of an opcode pattern, the opcode pattern comprising a sequence of instruction indicators, each instruction indicator indicative of a processor instruction of the distinct code block.

9. The method of claim 7, wherein the sequence of processor instructions consists of between 5 and 50 consecutive processor instructions.

10. The method of claim 9, wherein the sequence of processor instructions consists of between 5 and 15 consecutive processor instructions.

11. The method of claim 7, wherein the sequence of processor instructions starts with a CALL instruction.

12. The method of claim 7, further comprising:
performing a code normalization procedure on the target object to produce a normalized target object, and wherein each distinct code block consists of a sequence of computer instructions of the normalized target object; and
applying a hash function to the distinct code block to produce the target hash.

13. The method of claim 7, wherein the similarity score is determined as a function of:

$$C/\max(N_T, N_R)$$

wherein C denotes the count of hashes common to both the plurality of target hashes and the plurality of reference hashes, while $N_T$ and $N_R$ denote the cardinality of the plurality of target hashes and the cardinality of the plurality of reference hashes, respectively.

14. The method of claim 7, wherein the similarity score is determined as a function of:

$$C/(N_T + N_R)$$

wherein C denotes the count of hashes common to both the plurality of target hashes and the plurality of reference hashes, while $N_T$ and $N_R$ denote the cardinality of the plurality of target hashes and the cardinality of the plurality of reference hashes, respectively.

15. The method of claim 7, wherein the similarity score is determined as a function of:

$$C/N_T + C/N_R$$

wherein C denotes the count of hashes common to both the plurality of target hashes and the plurality of reference hashes, while $N_T$ and $N_R$ denote the cardinality of the plurality of target hashes and the cardinality of the plurality of reference hashes, respectively.

16. The method of claim 7, wherein the target object comprises a computer file.

17. The method of claim 7, wherein the target object comprises a computer process.

18. A computer system comprising at least a processor programmed to:
receive a plurality of target hashes, each target hash representing a distinct code block of a target object, each distinct code block consisting of a sequence of processor instructions of the target object;
for at least a target hash of the plurality of target hashes:
retrieve a plurality of reference hashes of a reference object, the reference object selected from a set of whitelisted objects according to the target hash, and
when the plurality of target hashes is not identical to the plurality of reference hashes, determine a similarity score according to a count of hashes common to both the plurality of target hashes and the plurality of reference hashes; and
when the similarity score exceeds a predetermined threshold, label the target object as non-malicious.

19. The system of claim 18, wherein the target hash comprises a hash of an opcode pattern, the opcode pattern comprising a sequence of instruction indicators, each instruction indicator indicative of a processor instruction of the distinct code block.

20. The system of claim 18, wherein the sequence of processor instructions consists of between 5 and 50 consecutive processor instructions.

21. The system of claim 20, wherein the sequence of processor instructions consists of between 5 and 15 consecutive processor instructions.

22. The system of claim 18, wherein the sequence of processor instructions starts with a CALL instruction.

23. The system of claim 18, wherein the processor is further programmed to:
- perform a code normalization procedure on the target object to produce a normalized target object, wherein each distinct code block consists of a sequence of computer instructions of the normalized target object; and
- apply a hash function to the distinct code block to produce the target hash.

24. The system of claim 18, wherein the similarity score is determined as a function of:

$$C/\max(N_T, N_R)$$

wherein C denotes the count of hashes common to both the plurality of target hashes and the plurality of reference hashes, while $N_T$ and $N_R$ denote the cardinality of the plurality of target hashes and the cardinality of the plurality of reference hashes, respectively.

25. The system of claim 18, wherein the similarity score is determined as a function of:

$$C/(N_T + N_R)$$

wherein C denotes the count of hashes common to both the plurality of target hashes and the plurality of reference hashes, while $N_T$ and $N_R$ denote the cardinality of the plurality of target hashes and the cardinality of the plurality of reference hashes, respectively.

26. The system of claim 18, wherein the similarity score is determined as a function of:

$$C/N_T + C/N_R$$

wherein C denotes the count of hashes common to both the plurality of target hashes and the plurality of reference hashes, while $N_T$ and $N_R$ denote the cardinality of the plurality of target hashes and the cardinality of the plurality of reference hashes, respectively.

27. The system of claim 18, wherein the target object comprises a computer file.

28. The system of claim 18, wherein the target object comprises a computer process.

29. A computer system comprising:
- means for receiving a plurality of target hashes, each target hash representing a distinct code block of a target object, each distinct code block consisting of a sequence of processor instructions of the target object;
- means for retrieving a plurality of reference hashes of a reference object, the reference object selected from a set of whitelisted objects according to a selected target hash of the plurality of target hashes;
- means for determining a similarity score according to a count of hashes common to both the plurality of target hashes and the plurality of reference hashes; and
- means for labeling the target object as non-malicious according to the similarity score.

30. A non-transitory computer-readable storage medium encoding instructions which, when executed on a processor, cause the processor to perform the steps of:
- receiving a plurality of target hashes, each target hash representing a distinct code block of a target object, each distinct code block consisting of a sequence of processor instructions of the target object;
- for at least a target hash of the plurality of target hashes:
  - retrieving a plurality of reference hashes of a reference object, the reference object selected from a set of whitelisted objects according to the target hash, and
  - when the plurality of target hashes is not identical to the plurality of reference hashes, determining a similarity score according to a count of hashes common to both the plurality of target hashes and the plurality of reference hashes; and
- when the similarity score exceeds a predetermined threshold, labeling the target object as non-malicious.

\* \* \* \* \*